(12) United States Patent
Marshall et al.

(10) Patent No.: US 10,210,088 B2
(45) Date of Patent: Feb. 19, 2019

(54) COMPUTING SYSTEM WITH A CACHE INVALIDATION UNIT, A CACHE INVALIDATION UNIT AND A METHOD OF OPERATING A CACHE INVALIDATION UNIT IN A COMPUTING SYSTEM

(71) Applicant: Freescale Semiconductor, Inc., Austin, TX (US)

(72) Inventors: Ray Charles Marshall, Harpenden (GB); Nancy Hing-Che Amedeo, Austin, TX (US); Joachim Fader, Munich (DE)

(73) Assignee: NXP USA, Inc., Austin, TX (US)

( * ) Notice: Subject to any disclaimer, the term of this patent is extended or adjusted under 35 U.S.C. 154(b) by 361 days.

(21) Appl. No.: 14/980,902

(22) Filed: Dec. 28, 2015

(65) Prior Publication Data
US 2017/0185519 A1   Jun. 29, 2017

(51) Int. Cl.
*G06F 12/0808* (2016.01)
*G06F 12/0831* (2016.01)
(Continued)

(52) U.S. Cl.
CPC ...... *G06F 12/0835* (2013.01); *G06F 12/0808* (2013.01); *G06F 12/0891* (2013.01); *G06F 13/28* (2013.01); *G06F 13/362* (2013.01); *G06F 2212/1008* (2013.01); *G06F 2212/283* (2013.01); *G06F 2212/621* (2013.01)

(58) Field of Classification Search
CPC ............. G06F 12/0808; G06F 12/0891; G06F 12/0875; G06F 12/0811; G06F 12/0835; G06F 13/362; G06F 13/28
See application file for complete search history.

(56) References Cited

U.S. PATENT DOCUMENTS

| | | |
|---|---|---|
| 5,392,422 A | 2/1995 | Hoel et al. |
| 6,438,672 B1 | 8/2002 | Fischer et al. |

(Continued)

FOREIGN PATENT DOCUMENTS

EP   0567708 A1   11/1993

OTHER PUBLICATIONS

Notice of Allowance for U.S. Appl. No. 14/524,378, filed Mar. 28, 2018, 8 pages.
(Continued)

*Primary Examiner* — Ernest Unelus

(57) ABSTRACT

The present application relates to a cache invalidation unit for a computing system having a processor unit, CPU, with a cache memory, a main memory and at least one an alternate bus master unit. The CPU, the main memory and the at least one an alternate bus master unit are coupled via an interconnect for data communications between them. The cache invalidation unit generates one or more invalidation requests to the cache memory in response to the alternate bus master unit writing data to the main memory. The cache invalidation unit comprises a page address generator unit to generate page addresses relating to at least one address range and an invalidation request generator unit to generate an invalidation request for each page address. The one or more generated invalidation requests are transmitted by the cache invalidation unit via to the cache memory of the CPU.

16 Claims, 7 Drawing Sheets

(51) Int. Cl.
　　　*G06F 12/0891*　　(2016.01)
　　　*G06F 13/362*　　　(2006.01)
　　　*G06F 13/28*　　　　(2006.01)

(56)　　　　References Cited

U.S. PATENT DOCUMENTS

| | | |
|---|---|---|
| 6,718,439 B1 | 4/2004 | Jayavant |
| 6,751,700 B2 | 6/2004 | Donoghue et al. |
| 6,877,063 B1 | 4/2005 | Allegrucci et al. |
| 7,114,031 B2 | 9/2006 | Lin et al. |
| 7,657,667 B2 | 2/2010 | Johns et al. |
| 8,473,667 B2 | 6/2013 | Mejdrich et al. |
| 2006/0230239 A1 | 10/2006 | Blumrich et al. |
| 2007/0283037 A1 | 12/2007 | Burns et al. |
| 2012/0324430 A1 | 12/2012 | Agarwal et al. |
| 2014/0297919 A1* | 10/2014 | Nachimuthu ........ G11C 14/009 711/102 |
| 2014/0359203 A1 | 12/2014 | Tipton et al. |
| 2015/0138884 A1 | 5/2015 | Park |
| 2016/0140042 A1* | 5/2016 | Mukherjee .......... G06F 12/0875 711/123 |
| 2016/0188486 A1* | 6/2016 | Sohi ................... G06F 3/061 711/118 |

OTHER PUBLICATIONS

Non-Final Office Action for U.S. Appl. No. 14/524,378, filed May 17, 2017, 9 pages.
Non-Final Office Action for U.S. Appl. No. 14/524,378, filed Oct. 16, 2017, 12 pages.

* cited by examiner

COMPUTING SYSTEM WITH A CACHE INVALIDATION UNIT, A CACHE INVALIDATION UNIT AND A METHOD OF OPERATING A CACHE INVALIDATION UNIT IN A COMPUTING SYSTEM

FIELD OF THE INVENTION

The present disclosure relates generally to semiconductors and, more specifically, to coherency for caches in data processing semiconductor chips.

BACKGROUND

Caching schemes have been employed by hardware designers to reduce access times by a Central Processor Unit (CPU) to main memory, and hence, increase system performance. In many computing systems, main memory consists of a large array of memory devices with speeds which are slow relative to processor speeds. During accesses to main memory, the processor is forced to insert additional wait states to accommodate the slower memory devices. System performance during memory accesses can be enhanced with a cache. Smaller in size than main memory and significantly faster, the cache provides fast local storage for data and instruction code which is frequently used by the processor. In computing systems with caches, memory operations by the processor are first transacted with the cache. The slower main memory is only accessed by the processor if the memory operation cannot be completed with the cache. In general, the processor has a high probability of fulfilling a majority of its memory operations with the cache. Consequently, in computing systems which employ a cache, effective memory access times between a processor and relatively slow main memory can be reduced.

Caches can be highly optimized according to a number of different features. One important feature which affects cache performance and design complexity is the handling of writes by the processor or an alternate bus master. Because two copies of a particular piece of data or instruction code can exist, one in main memory and a duplicate copy in the cache, writes to either main memory or the cache can result in an incoherence between the two storage systems.

For example, specific data is stored in a predetermined address in both the cache and main memory. During a processor read to the predetermined address, the processor first checks the contents of the cache for the data. Finding the data in the cache, the processor proceeds to read the data in the cache at the predetermined address. In systems with an alternate bus master, Direct Memory Access (DMA) writes to main memory by the alternate bus master modify data in main memory but not the cache. The cache and main memory may be incoherent.

During a DMA write operation, incoherency between the cache and main memory can be handled with bus 'snooping' or monitoring, instructions executed by the operating system, or combinations thereof. In a "write-through" and a "write-back" cache, bus snooping invalidates cache entries which become "stale" or inconsistent with main memory following the DMA write operation. Additionally, cache PUSH and INVALIDATE instructions can be executed by the operating system prior to the DMA write operation, to WRITE "dirty" or altered data out to main memory, and to invalidate the contents of the entire cache. Since only a single copy of data exists in main memory following the instructions, the DMA write to main memory will not present the problem of possibly "stale" data in the cache.

The implementation of bus snooping is expensive in view of the complexity of the snooping logic, to space requirement of the logic and the power consumption. In particular, space requirement and power consumption are subject to design constraints with respect to system-on-chips to be used in embedded applications. Executing cache PUSH and INVALIDATE instructions at a processor unit prior to the DMA write operation increases load at the processor unit, increases complexity of operating system/applications, is error prone and difficult to debug, each representing primary issues in the field of embedded applications.

For instance, in the field of vision processing large amounts of data is written to a continuous memory space in the main memory in a very structured and time bound manner. The large amounts of data is typically written to the memory using bus mastering or DMA write operations. Any copies are inconsistent with the data stored within the continuous memory space in the main memory.

Hence, there is a need for a solution to prevent cache and main memory incoherency in systems with an alternate bus master overcoming the aforementioned drawbacks.

SUMMARY

The present invention provides a computing system with a cache invalidation unit, a cache invalidation unit and a method of operating a cache invalidation unit in a computing system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
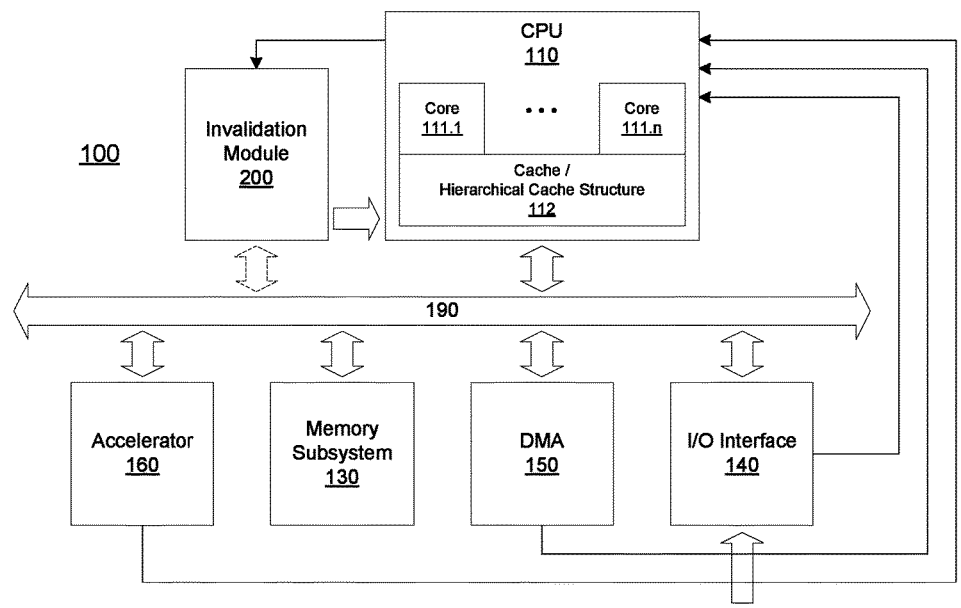
FIG. 1 schematically illustrates a block diagram of a computing system according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Referring now to FIG. 1, a schematic block diagram of an illustrative computing system 100, in particular a SoC (system-on-chip), a SiP (system-in-package) or a SoP (system-on-package), according to examples of the present application is shown. The computing system 100 is composed of several functional units. The computing system comprises one or more interconnects, which enable data communications between the functional units of the computing system 100. For the sake of explanation and illustration, the functional units of the exemplary computing system 100 comprise a processor unit (CPU) 110, a main memory 130, which is for instance a main memory subsystem 130 having a memory controller interfacing to one or more DRAM (dynamic random access memory) modules, a direct memory access (DMA) unit 150, a I/O interface 140 and an accelerator unit 160, which are coupled to a system interconnect 190 for data communications between them. The exemplary computing system 100 further comprises a cache invalidation unit 200, which allows for invalidating copies in a cache memory in case the copies in the cache memory 112 are outdated due to bus master and/or DMA write data transfers to the main memory 130. The bus master and/or DMA write data transfers to the main memory 130 are unobserved by the cache memory resulting to incoherency. The cache invalidation unit 200 is coupled to the processor unit (CPU) 110 and in particular to the cache memory 112 to communicate invalidation requests. In an example of the present application, the cache invalidation unit 200 is coupled to the system interconnect 190 for communication configuration requests between the cache invalidation unit 200 and the processor unit (CPU) 110.

The processor unit (CPU) 110 may be a general purpose processor, the processor unit (CPU) 110 may have a single or multiple core design. The processor unit (CPU) 110 with a multiple core design may integrate different types of processor cores implemented as symmetrical or asymmetrical multiprocessor. Herein, the processor unit (CPU) 110 comprises the cores 111.1 to 111.n for the sake of illustration.

The processor unit (CPU) 110 further comprises the cache memory 112. The cache provides a fast local storage for data and instruction code. The cache implements a caching strategy and stores copies of the data and instruction code stored in the main memory 130. The caching strategy (including replacement policies and writing policies) may for instance prefer accessed data and instruction code to be stored as copies thereof in the cache memory to improve the performance of the processor unit (CPU) 110. The cache memory 112 may comprise a data cache, instruction cache and translation lookaside buffer for virtual-to-physical address translation.

The cache memory 112 may comprise one or more private caches, to each of which only one of the cores 111.1 to 111.n of the processor unit (CPU) 110 has access, and/or a shared cache, to which all cores 111.1 to 111.n have access. The cache memory may have a hierarchical cache structure comprising different cache levels.

Those skilled in the art will understand from the following description that the implementation and organization of the cache memory is out of the scope of the present application. The cache memory 112 may be for instance implemented to employ a coherency protocol to ensure the consistency between the one or more separate caches of the cache memory 112. It should be further understood that the coherency protocol employed by the cache memory 112 is limited to consistency of the cache memory 112. Hence, any write accesses of a bus master unit to the main memory results to incoherence of cache memory 112 and main memory 130 (provided the cache memory stores one or more copies of data at addresses in the main memory 130, to which the bus master unit writes new or altered data.

The interconnect 190 should be understood to comprise for instance one or more shared interconnecting buses for connecting multiple functional units of the computing system 100 to enable data communications between them. The multiple functional units are connected to a bus listen to signals asserted on the bus.

The interconnect 190 should be further understood to comprise for instance one or more switch fabrics or crossbar switches for connecting multiple functional units of the computing system 100 to enable non-blocking many-to-many data communications mechanisms for two-way data communications between them. The switch fabrics or crossbar switches support multiple simultaneous data communications between connected functional units.

The I/O interface 140 should be understood to represent any data input/output interface arranged for data communications with a device (not shown) external to the computing system 100. The I/O interface 140 may have bus master functionality, which allows the I/O interface 140 to access main memory 130 for reading and/or writing independently of the processor unit (CPU) 110. Otherwise, the processor unit (CPU) 110 would have to copy each piece of data from the I/O interface 140 being the data source to the main memory 130 being the data destination. This is typically slower than copying blocks of memory since access to the I/O peripherals 140 is typically slower than system memory 130. During this time the processor unit (CPU) 110 may be unavailable for other tasks involving access to the interconnect 190, although it could continue doing any work, which do not require bus access to the interconnect 190.

In particular, the bus master functionality enables the I/O interface 140 to write data received from the external device directly into the main memory 130 independent from and without involvement of the processor unit (CPU) 110. The received data is written to one or more predefined memory regions of the memory space of the main memory 130. In case the cache memory 112 of the processor unit (CPU) 110 stores one or more copies of data stored in the main memory 130 within the one or more predefined memory regions, the writing of the data received by the I/O interface 140 yields to incoherence of cache memory 112 and main memory 130.

In an example of the present application, the I/O interface 140 is arranged to interface with one or more video cameras and to receive frame data of one or more video sequences taken by the video cameras. The frame data received by the I/O interface 140 is written to one or more predefined memory regions of the memory space of the main memory 130. In an example, the frame data received by the I/O interface 140 is frame-wise written to the main memory 130. The I/O interface 140 may comprise a buffer for storing data received in form of a substantially continuous data stream.

The direct memory access (DMA) unit 150 may be comprises in the computing system 100 to remove tasks of data transfers between functional units of the computing system 100 and memory 130 comparable to bus master functionality. Direct memory access (DMA) data transfers are commonly used in computing systems to transfer data from various functional units in the computing system with minimal involvement of the processor unit (CPU) 110. Direct memory access (DMA) is a feature that allows functional units within the computing system 100 to access main memory 130 for reading and/or writing independently and without involvement of the processor unit (CPU) 110. Otherwise, the processor core 110 would have to copy each piece of data from the source to the destination.

In a typical DMA transfer between, for example, a peripheral such as the I/O interface 140 and a main memory 130, initiation of the transfer may be controlled by the I/O interface 140 or the processor unit (CPU) 110 via a DMA transfer request sent by the DMA transfer initiating instance (e.g. I/O interface 140 or the processor unit (CPU) 110) to the DMA controller 150. The DMA controller 150 may queue the received DMA transfer requests and perform the queued DMA transfer requests in a predefined order. Such a DMA transfer request comprises the source and the destination of the data to be transferred by the DMA controller 150. Please note that the computing system 100 may include a plurality of DMA controllers each performing independently DMA transfers within the computing system 100 provided there are no conflicts due to shared resource use and resource use restrictions.

The direct memory access (DMA) unit 150 may be used to write data received by the I/O interface 140 from the external device directly into the main memory 130 independent from and without involvement of the processor unit (CPU) 110.

The accelerator unit 160 may be comprised in the computing system 100 to remove computing tasks from the processor unit (CPU) 110. The accelerator unit 160 is typically designed and implemented to perform one or more specific computing functionalities; e.g. the accelerator unit 160 may be a graphics processing unit (GPU), a digital signal processing (DSP) unit, a fast Fourier transform (FFT) unit and the like. The accelerator unit 160 is designed to perform the one or more specific computing functionalities faster and/or more economically (e.g. with less power consumption) than the processor unit (CPU) 110 typically implemented as a general data processing unit.

The accelerator unit 160, e.g. configured by the processor unit (CPU) 110 to perform one or more specific tasks, is arranged to perform the configured specific tasks independent from and without involvement of the processor unit (CPU) 110. The accelerator unit 160 may have bus master functionality or make use of the direct memory access (DMA) unit 150 to read data stored in the main memory 130 and to write processing result data to the main memory 130. The read data and the result data may be stored in the same one or more memory regions or in one or more different memory regions. In case the cache memory 112 of the processor unit (CPU) 110 stores one or more copies of data stored in the main memory 130 within the one or more predefined memory regions of the result data, the writing of the result data of the accelerator unit 160 yields to incoherence of cache memory 112 and main memory 130.

The cache invalidation unit 200 of the computing system 100 is arranged to invalidate one or more data copies stored in the cache memory 112 to prevent incoherence of cache memory 112 and main memory 130. The risk of incoherence of cache memory 112 and main memory 130 is illustrated above with respect to the I/O interface unit 140 and the accelerator unit 160. The cache invalidation unit 200 is arranged as a hardware module, which is preconfigured with one or more memory regions (address blocks). In response to a trigger signal, e.g. received from the processor unit (CPU) 110, the cache invalidation unit 200 is arranged to generate one or more invalidation requests based on the one or more preconfigured memory regions and to transfer the one or more generated invalidation requests to the cache memory 112. The cache memory 112 invalidates any copies of data stored there in response to the transferred invalidation requests and in case the stored copies are copies of data within the one or more preconfigured memory regions. Accordingly, an incoherence due to bus master or direct memory access (DMA) data write access to the main memory 130 can be prevented.

Figure 2:
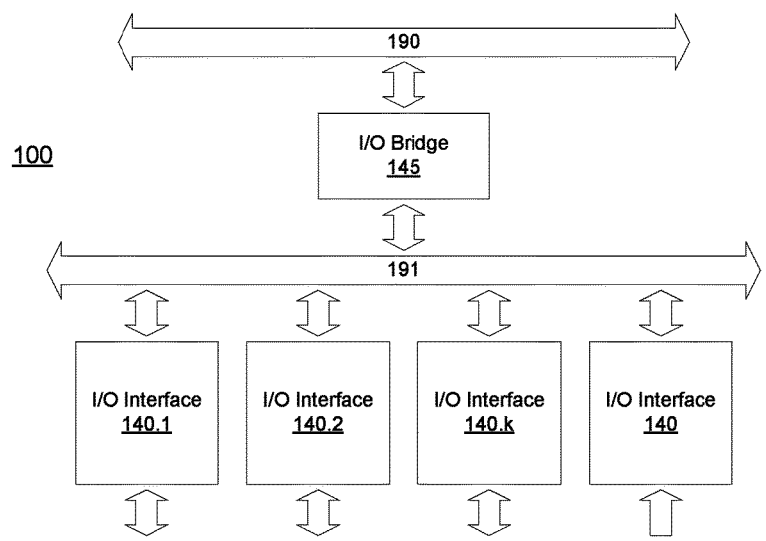
FIG. 2 schematically illustrates a block diagram of an I/O subsystem of the computing system of FIG. 1 according to an example of the present invention.

Referring now to FIG. 2, a block diagram of an I/O subsystem with an I/O interface 140 according to an example of the present application is schematically illustrated. Those skilled in the art will understand that the I/O subsystem illustrated in FIG. 2 may be part of the computing system described above with reference to FIG. 1.

Although, the I/O interface 140 shown in FIG. 1 is coupled to the interconnect 190, it should be understood that the I/O interface 140 may be part of an I/O subsystem, which comprises several I/O interfaces coupled to an I/O interconnect. An exemplary I/O subsystem with I/O interfaces 140.1 to 140.k and 140 is illustrated in the schematic block diagram of FIG. 2. The exemplary I/O interfaces 140.1 to 140.k and 140 are coupled to an I/O interconnect 191, which is coupled in turn to the system interconnect 190 via an I/O bridge unit 145 interfacing the data communications between the I/O interconnect 191, the I/O interfaces 140.1 to 140.k and 140 coupled thereto and the system interconnect 190.

Figure 3:
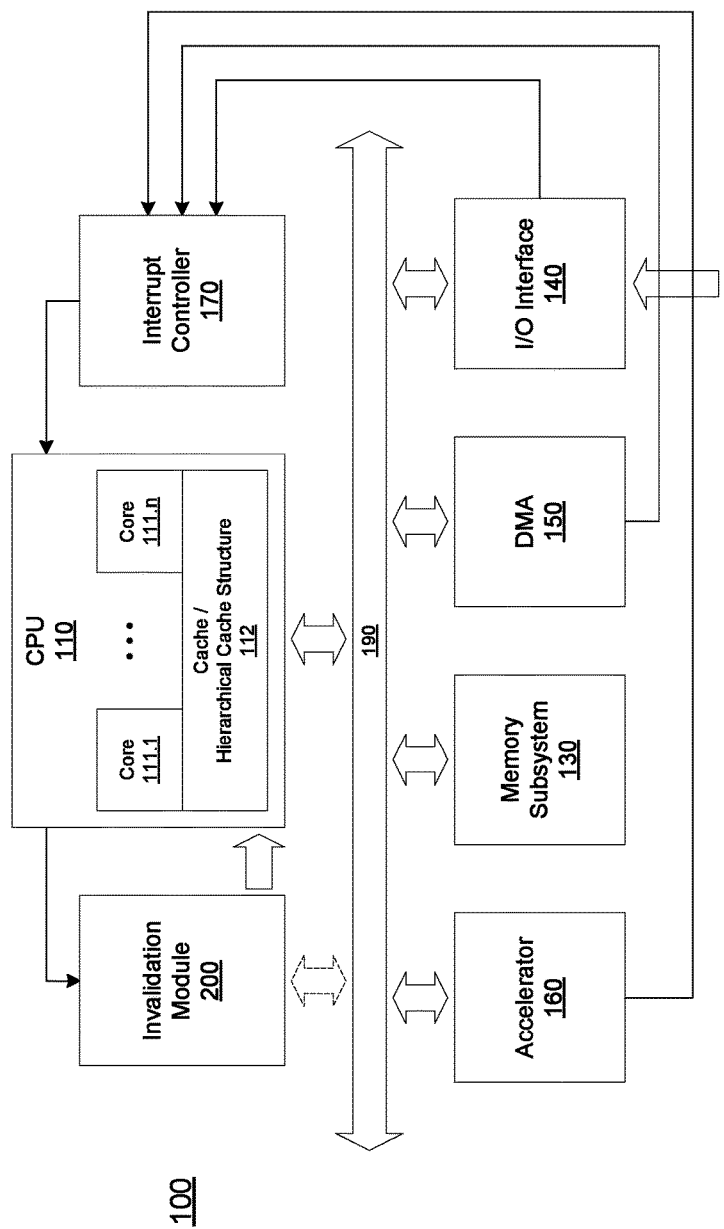
FIG. 3 schematically illustrates a block diagram of a computing system according to another example of the present invention.

Referring now to FIG. 3, a schematic block diagram of an illustrative computing system 100 according to another examples of the present application is shown. The exemplary computing system 100 of FIG. 3 further comprises an interrupt controller 150. The computing system 100 of FIG. 3 may be understood as a variant of the exemplary computer systems described above with reference to FIGS. 1 and 2. The description and statements made above with reference to FIGS. 1 to 3 apply likewise hereto.

The interrupt controller 150 of the computing system 100 enables functional units thereof to indicate and/or report status, exception or error information to the processor unit (CPU) 110, at which an appropriate interrupt service routine, ISR, is executed in response to a received interrupt signal. The interrupt controller 150 may buffer and prioritize the received interrupt signal before forwarding to the processor unit (CPU) 110.

The I/O interface 140, the direct memory access (DMA) unit 150 and/or the accelerator unit 160 are coupled to the interrupt controller 170 to indicate bus master and/or direct memory access (DMA) write accesses to the main memory 130 by issuing an IRQ (interrupt request). The I/O interface 140, the direct memory access (DMA) unit 150 and/or the accelerator unit 160 may be coupled via separate wirings to the interrupt controller 170. The interrupt controller 170 is arranged to receive an IRQ and to assert a processor IRQ (PIR) to the processor unit (CPU) 110 and one or more of the cores 1111 to 111.n thereof, respectively. The processor IRQ (PIR) is indicative of the bus master and/or direct memory access (DMA) write access to the main memory 130 including for instance information about the source of the data written to the main memory, the one or more memory regions, to which the data is written, and/or initiator of the IRQ. The source may be the initiator of the write access and/or the IRQ.

Figure 4:
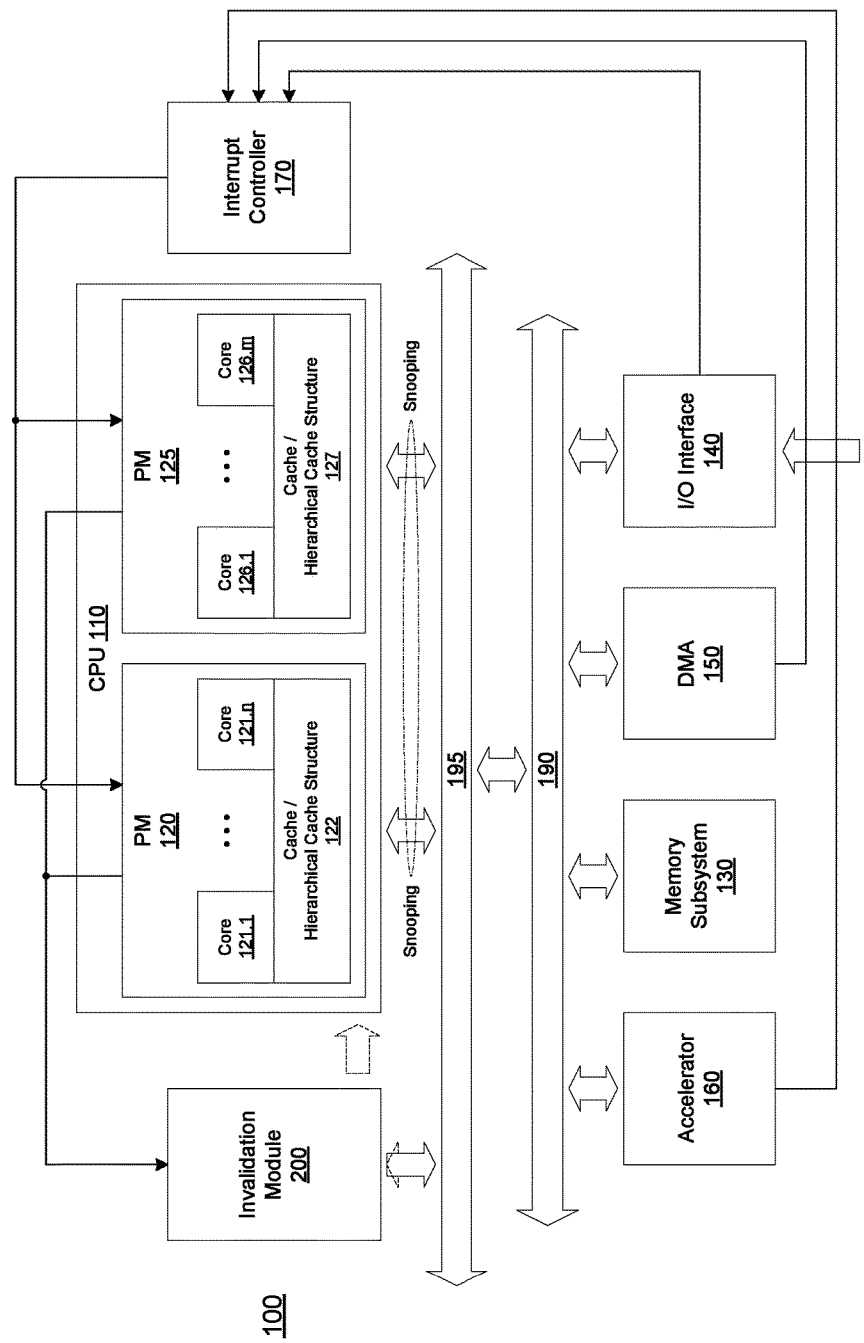
FIG. 4 schematically illustrates a block diagram of a computing system according to a further example of the present invention.

Referring now to FIG. 4, a schematic block diagram of an illustrative computing system 100 according to yet another examples of the present application is shown. The exemplary computing system 100 of FIG. 4 has a processor unit (CPU) 110 with a first processor module (PM) 120 and a second processor module (PM) 125 representatively illustrating a processor unit (CPU) 110 with several processor modules (PMs). The computing system 100 of FIG. 4 may be understood as a variant of the exemplary computer systems described above with reference to FIGS. 1 to 3. The description and statements made above with reference to FIGS. 1 to 3 apply likewise hereto.

Each of the processor modules (PM) 120 and 125 may be a general purpose processor and may have a single or multiple core design. The first processor module (PM) 120 and/or the second processor module (PM) 125 with a multiple core design may integrate different types of processor cores implemented as symmetrical or asymmetrical multiprocessor. Herein, the first processor module (PM) 120 comprises the cores 121.1 to 121.n and the second processor module (PM) 125 comprises the cores 126.1 to 126.m for the sake of illustration.

The processor modules (PMs) 120 and 125 further comprises a cache memory 122 and a cache memory 127, respectively. The cache memories 122 and 127 may comprise one or more private caches, to each of which only one of the cores 121.1 to 121.n of the first processor module (PM) 120 or only one of the cores 127.1 to 127.m of the second processor module (PM) 125 has access. The cache memories 122 and 127 may each comprise a shared cache, to the respective one of which all cores 121.1 to 121.n of the first processor module (PM) 120 or all cores 127.1 to 127.m of the second processor module (PM) 125 have access. The cache memories may have a hierarchical cache structure comprising different cache levels.

The first processor module (PM) 120 and the second processor module (PM) 125 of the multi-module processor unit (CPU) 110 are coupled to a processor coherent interconnect 195, which is in turn coupled to the system interconnect 190 of the computing system 100. The processor coherent interconnect 195 and the system interconnect 190 of the computing system 100 may be coupled via a bridge unit (not shown). The processor coherent interconnect 195 may be considered to be a part of the multi-module processor unit (CPU) 110.

In order to ensure coherence between the cache memories 122 and 127 of the first and the second processor modules (PMs) 120 and 125, a snooping logic may be implemented to ensure coherence between the cache memories 122 and 127 of the first and the second processor modules (PMs) 120 and 125.

In the shown example, the cache invalidation unit 200 is coupled to the processor coherent interconnect 195 but may likewise be coupled to the processor unit (CPU) 110 as described with respect to above examples and in particular FIG. 1. In an example of the present application, the cache invalidation unit 200 is coupled to the processor coherent interconnect 195 or the system interconnect 190 for communication configuration requests between the cache invalidation unit 200 and the processor unit (CPU) 110.

Figure 5:
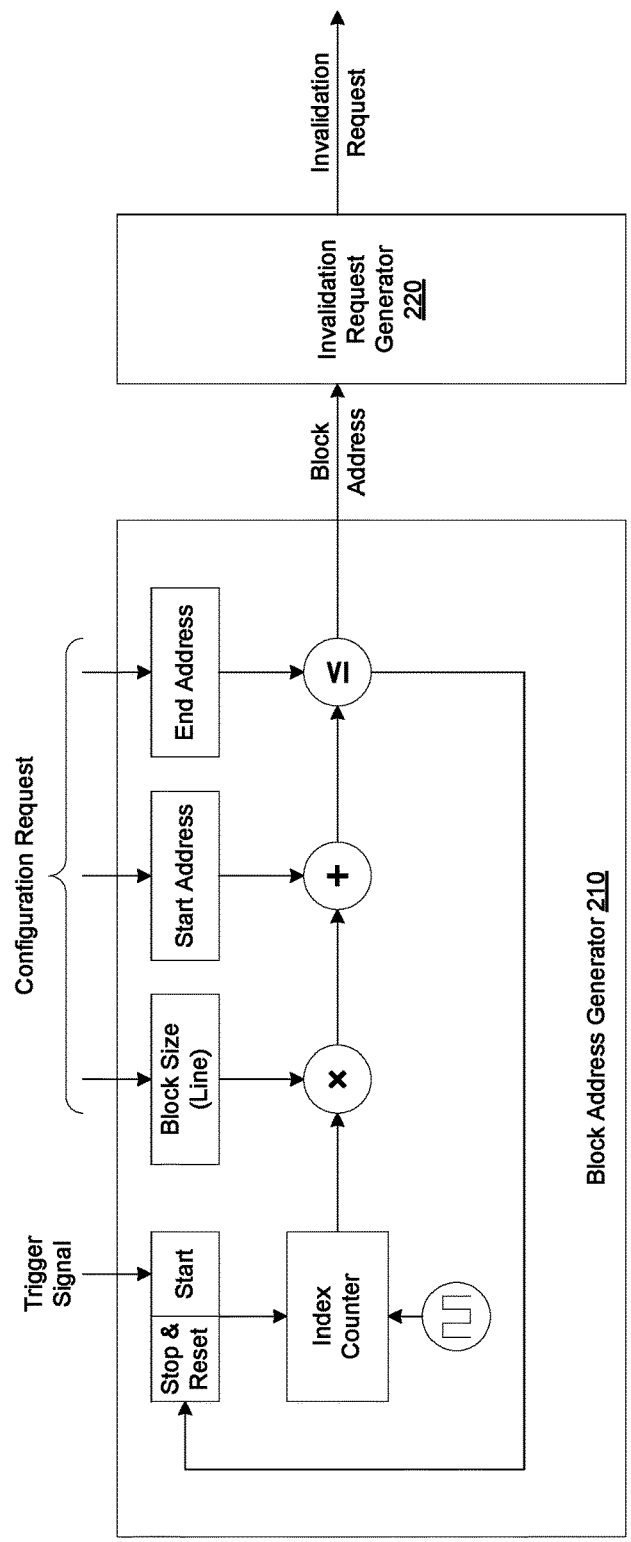
FIG. 5 schematically illustrates a block diagram of a cache invalidation unit according to an example of the present invention.

Referring now to FIG. 5, a block diagram of a cache invalidation unit according to an example of the present application is schematically illustrated.

The illustrated cache invalidation unit 200 comprises a page address generator unit 210 and an invalidation request generator unit 220. The page address generator unit 210 is arranged to generate one or more page addresses based on information relating to a memory region and a page size.

For the sake understanding of the following description, it should be mentioned that data is transferred between main memory and cache memory in pages of fixed size, called cache lines. When a cache line is copied from memory into the cache, a cache entry is created. The cache entry will include the copied data as well as the requested memory location (now called a tag). Each page comprises a fixed number of bits. For instance, a page may comprise 256 bits (corresponding to 32 (8-bit) bytes or 8 (32-bit) words)

Further, it should be noted that various techniques are known for implementing the mapping pages of main memory into cache memory. Typical forms of mapping include direct, 2/4/8/12-way set associative and fully associative mapping to mention a non-limiting exemplary enumeration of forms of mapping. Different configurations of cache memory are used for different applications including different forms of mapping in order to increase performance for the particular application. For example, differences which exist between data and instruction memory access patterns permit smaller, partitioned (i.e. instructions and data) caches to achieve higher hit ratios. Also, 2-way set associative cache is often adequate for instruction caches; however, 4/8/12-way set associative cache often provides better performance for a data cache.

The specific configuration of the cache memory and page mapping technique used is out of the scope of the present application. In common to all configurations of cache memory, the smallest "data size unit" in the cache memory, which can be invalidated, is a page (or cache line). A data read request of the processor unit (CPU) 110 (and one of the cores thereof, respectively) addressing a piece of data comprised in an invalidated page in the cache memory yields to a data read miss, which refers to a failed attempt to read the piece of data from the cache memory, which results in a read access to the main memory. In other words, a read access to the main memory can be forced by invalidating a block (or cache line) in the cache memory to ensure that outdated an outdated copy of data is not used anymore for processing at the processor unit (CPU) 110.

The page address generator unit 210 is arranged to generate one or more page addresses based on an address range defined by a start address and an end address and a page size. The address range is configurable for instance by an application (e.g. running at elevated privilege level) executed on the processor unit (CPU) 110. The page size may be also configurable or may be preconfigured. Conventionally, the page size of the cache memory 112, 125, 127 is fixed by design of the cache memory. Accordingly, the block size may be preconfigured without limiting the functionality of the cache invalidation unit 200.

The cache invalidation unit 200 may comprise a configuration interface (not shown) for receiving configuration requests including information relating to the address range. The configuration interface may be coupled to the system interconnect 190 or the bus interconnect 195 or the IO Interface (140) to receive configuration requests.

The page address generator unit 210 may comprise an upcounting index counter in accordance with a clock signal on a trigger signal starting the upcounting index counter with an initial counter value. The initial counter value may be 0. In order to calculate the one or more page addresses, each counter value is multiplied with the page size and resulting product is added to the start address. The calculated page address is then passed to the invalidation request generator unit 220 as long as the calculated page address is lower than or equal to the end address. In case the calculated page address is higher than the end address, the upcounting index counter is stopped and reset to the initial counter value.

The invalidation request generator unit 220 is coupled to the page address generator unit 210 to receive the one or more page addresses generated there and arranged to generate an invalidation request based on each page address received from the page address generator unit 210. The invalidation request comprises the generated page address. The generate invalidation request(s) is/are transferred to the cache memory 112, 125, 127 of the processor unit (CPU) 110. At the cache memory 112, 125, 127, the page(s) with address(es) corresponding to the received invalidation request(s) is/are invalidated. The cache memory 112, 125, 127 comprises an invalidation logic, which is arranged to receive an invalidation request, to compare the page address indicated by the invalidation request with memory addresses associated with the stored pages of data copies and to mark the cached page as invalidated in case matching addresses.

Figure 6:
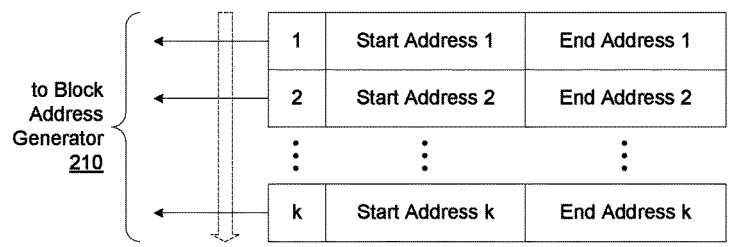
FIGS. 6 to 8 schematically illustrates tables comprising address range information applicable with cache invalidation units according to examples of the present invention.
Figure 7:
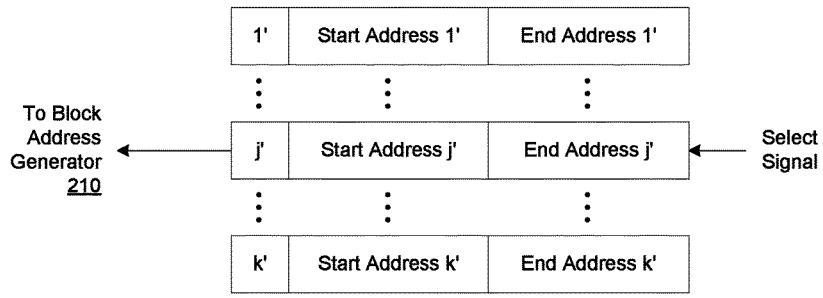
Figure 8:
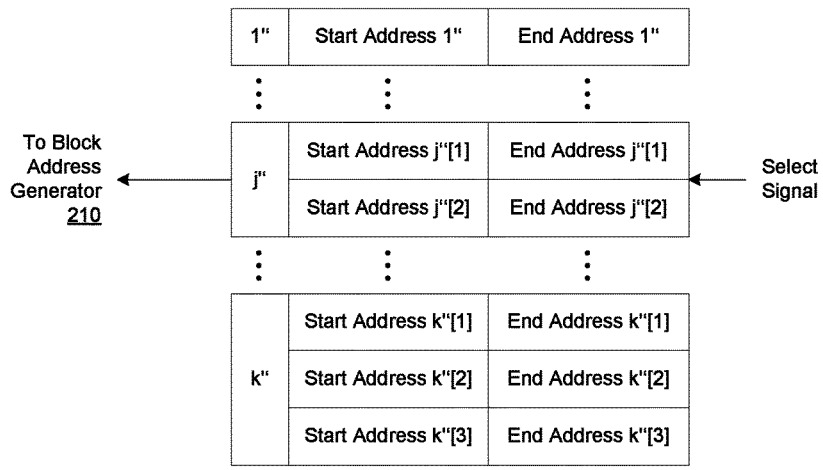

Referring now to FIGS. 6 to 8, a schematic diagrams of address range tables are shown. In examples of the present application, the cache invalidation unit 200 may comprise an address range table, which comprises a plurality of address range sets. One or more address range sets may be passed to the page address generator module unit 210 for generating page addresses.

The address range tables may be configurable for instance by an application (e.g. running at elevated privilege level) executed on the processor unit (CPU) 110 via the configuration interface of the cache invalidation unit 200.

In an example illustrated in FIG. 6, the address range table comprises a number of k address range sets, each defining an address range starting from a start address and ending at an end address. In response to the trigger signal, e.g. issued by the processor unit (CPU) 110 to the cache invalidation unit 200, the address range sets are sequentially supplied to the page address generator unit 210, which generates one or more page addresses for each set of the k address range sets maintained in the address range table.

In an example illustrated in FIG. 7, the address range table comprises a number of k' address range sets, each defining an address range starting from a start address and ending at an end address. In response to the trigger signal, e.g. issued by the processor unit (CPU) 110 to the cache invalidation unit 200, one address range set (herein set j') out of the plurality of k' address range sets is supplied to the page address generator unit 210, which generates one or more page addresses for the supplied address range set. The one address range set (herein set j') to be supplied to the page address generator unit 210 is indicated by a select signal, which may be comprised in the trigger signal, which may be preconfigured (configured previous to the reception of the trigger signal) at the cache invalidation unit 200 or which may be separately received by the cache invalidation unit 200, e.g. from the processor unit (CPU) 110.

In an example illustrated in FIG. 8, the address range table comprises a number of k" address range sets. Each address range set may comprise one or more address ranges each defining an address range starting from a start address and ending at an end address. In response to the trigger signal, e.g. issued by the processor unit (CPU) 110 to the cache invalidation unit 200, one address range set (herein set j") out of the plurality of k" address range sets is supplied to the page address generator unit 210, which generates one or more page addresses for the supplied address range set, which may define one or more address ranges (herein 2 address ranges). The one address range set to be supplied to the page address generator unit 210 is indicated by a select signal, which may be comprised in the trigger signal, which may be preconfigured (configured previous to the reception of the trigger signal) at the cache invalidation unit 200 or which may be separately received by the cache invalidation unit 200, e.g. from the processor unit (CPU) 110.

Exemplary use cases of the cache invalidation unit 200 will be briefly described with reference to FIGS. 9 to 11. The FIGS. 9 to 11 schematically depicts the address space of the main memory structured into blocks with a size corresponding to the block size (cache line size) of the cache memory.

Figure 9:
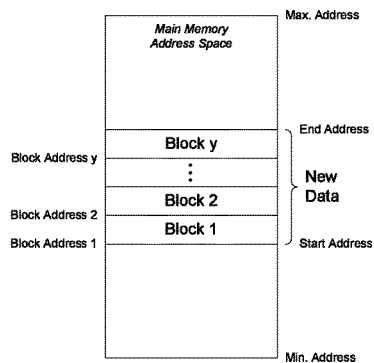
FIGS. 9 to 11 schematically address spaces of the main memory of exemplary use cases of cache invalidation units according to examples of the present invention.

Referring to FIG. 9, the new data is written to an address range of the address space of the main memory 130. The address range is defined by the start address and the end address. The address range, into which the new data is written, e.g. by the bus master I/O interface 140 receiving a frame of a video data stream from an external video camera, is configured at the cache invalidation unit 200. On indication that the new block of data is written, the new block of data writing is currently under way, the writing of the new block of data will be conducted, or the processor unit (CPU) 110 has finished processing the current block of data, the cache invalidation unit 200 issues one or more invalidation requests to the cache memory. Each invalidation request relates to one of the page addresses 1 to y until the entire block of memory is cache invalidated.

Figure 10:
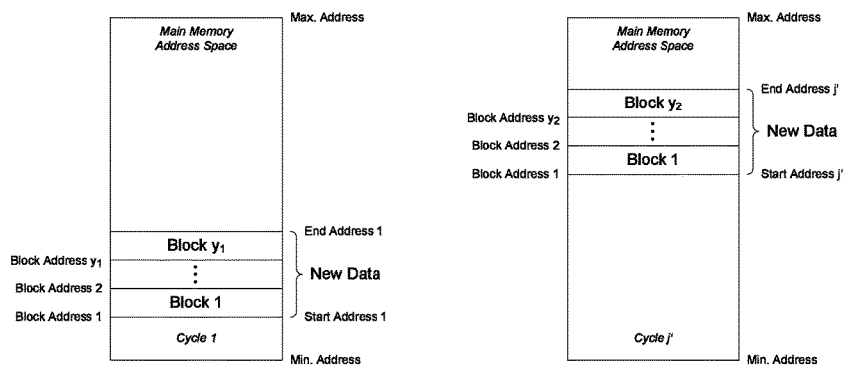
Figure 11:
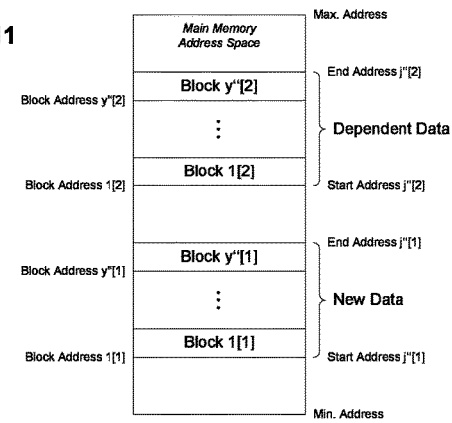

Referring to FIG. 10, new data is written part-by-part to the main memory. In each cycle, a part of the new data is written to another address range of the address space of the main memory 130. In a first cycle, a first part of the new data is written to an address range defined by the start address 1 and the end address 1. In a cycle j', a j'th part of the new data is written to an address range defined by the start address j' and the end address j'. In a last cycle k', a k'th part of the new data is written to an address range defined by the start address k' and the end address k'. The address ranges may be configured in a table as exemplified with reference to FIG. 7. On indication e.g. that the j'th part of the new data block is written, the j'th part of the new data block writing is currently under way, the writing of the j'th part of the new data block will be conducted, the processing unit (CPU) 110 has finished processing the j'th part of the previous data block, the respective address range set j' out of the address range set 1' to k' is selected and the cache invalidation unit 200 issues one or more invalidation requests based on the start address j' and end address j' to the cache memory.

For instance, the bus master I/O interface 140 writes the frames of a video data stream part-by-part (e.g. per each line/column or per each set of lines/columns) into the main memory 130; each frame may comprise k' lines/columns. The invalidation requests generated issued by the cache invalidation unit 200 relate to the address range, in which the respective part of the frame data is stored.

Referring to FIG. 11, the main memory may comprise derived data, which is dependent on the input data. The derived data may be understood to be function of the input data. In case the input data is altered and/or the address range, in which the input data is stored in the main memory, is written with new data, the derived data is outdated because it depends on outdated input data.

For instance, the input data is provided by the bus master I/O interface 140 receiving a video data frame. The input data may comprise data of a video frame, which is written to the address range j"[1] defined by the start address j"[1] and the end address j"[1]. The frame data is for instance processed by the accelerator unit 160 offering graphics processing capability for object recognition, for corner detection including for instance generating a Harris Corner list, for generating a Hough transform table, for generating a histogram of oriented gradients descriptor, for producing metadata and the like. The processed frame data represent the aforementioned derived data are stored in an address range j"[2] defined by the start address j"[2] and the end address j"[2]. In case frame data of a new frame is written to the address range j"[1], the derived data stored in the address range j"[2] are outdated.

Hence, on indication that the new data is written, the new data writing is currently under way, the writing of the new data will be conducted or the processing unit (CPU) 110 has finished processing the current data the cache invalidation unit 200 issues one or more invalidation requests to the cache memory relating to the address range of the new data and cache invalidation unit 200 issues one or more invalidation requests to the cache memory relating one or more address ranges in which derived data is stored.

A table as described with reference to FIG. 6 or FIG. 8 may be accordingly configured and applied in the aforementioned use case to cause the cache invalidation unit 200 to issue one or more invalidation requests comprising page addresses relating to distinct address ranges.

Figure 12:
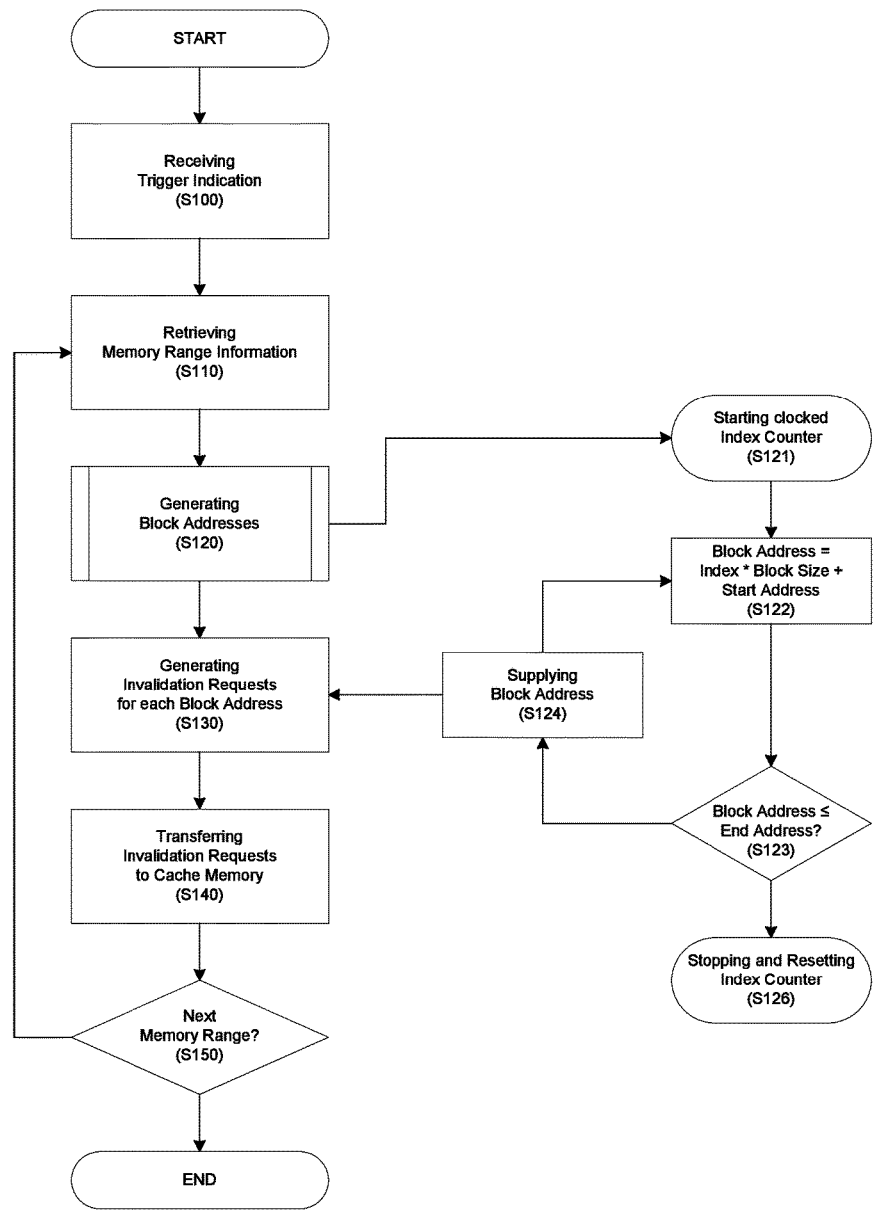
FIG. 12 schematically illustrates a flow diagram of a method of operating a cache invalidation unit according to an example of the present invention.

Referring now to FIG. 12, a flow diagram of a method of operating a cache invalidation unit according to an example of the present invention is schematically illustrated.

In an operation S100, a trigger signal is received by the cache invalidation unit 200. The trigger signal indicates the cache invalidation unit 200 to generate invalidation requests. The trigger signal may be received from the processor unit, CPU, 110 and any core 111.1 to 111.$n$, 121.1, 121.$n$, 126.1 to 126.$m$ thereof, respectively. The trigger signal may be received from a functional unit of the computing system 100, which has transferred, transfers or will transfer data to the main memory 130 of the computing system, or which has caused, causes or will cause the data transfer. In particular, the trigger signal may be received from the I/O interfaces 140, the direct memory access (DMA) unit 150 or the accelerator unit 160.

The trigger signal may comprise a select information, on the basis of which one or more address ranges are retrievable out of a plurality of address ranges, e.g. stored in a table.

In an operation S110, an address range information is retrieved by the cache invalidation unit 200. The address range information may be retrieved from a configurable memory comprised by the cache invalidation unit 200. The trigger signal may comprise a select information, on the basis of which one or more address ranges are retrievable out of a plurality of address ranges stored in the cache invalidation unit 200. The plurality of address ranges may be stored in a configurable table comprised by the cache invalidation unit 200.

In an operation S120, one or more page addresses are generated based on the address range. The address range comprises a start address and an end address. The page addresses are generated in accordance with a page size. The page size may be preconfigured and may correspond to a page size of the cache memory 112, 122, 127 of the processor unit (CPU) 110, wherein the page size is a fixed size.

In an operation S130, an invalidation request is generated by the cache invalidation unit 200 for each generated block address.

In an operation S140, the one or more generated invalidation requests are transferred to the cache memory 112, 122, 127 of the processor unit (CPU) 110.

In an operation S150, it is determined whether one or more invalidation request should be generated for a next address range. Accordingly, the flow of operation commences with the operation S110, in which the next address range is retrieved, or the flow of operation ends.

In an example of the present application, the one or more page addresses are generated successively:

In an operation S121, an index counter having an initial index value is started. The index counter is clocked by a clock signal and the index value of the index counter increases each clock cycle by one. The initial index value is equal to zero.

In an operation S122, a page address is generated by multiplying the index value with the page size and adding the start address.

In an operation S123, it is checked whether the generated page address is smaller than or equal to the end address and the operational flow commences with an operation S124 if this is the case. Otherwise the operational flow continues with an operation S126.

In the operation S124, the generated page address is provided for generating an invalidation request based thereon and the operational flow commences with generating a next page address in the operation S122 with an increased index value.

In an operation S126, the index counter is stopped and reset to the initial index value, which concludes the generation of page addresses.

The cache invalidation unit 200 has been described above with reference to a generic computing system 100. Those skilled in the art will appreciate and understand from the above that the cache invalidation unit 200 is in particular applicable with interconnect implementations for connection and management of functional units in computing systems, e.g. system-on-chip (SoC), designs supporting additional signaling for system wide coherency management.

The cache invalidation unit 200 is in particular applicable in case large amounts of data is written to a continuous memory space in the main memory in a very structured and time bound manner. This is in particular the case in the field of vision processing as already aforementioned. The proposed cache invalidation unit 200 leverage the structured organization of data in the main memory periodically replaced with new data.

An example of such an interconnect implementation is the Advanced Microcontroller Bus Architecture (AMBA) of version 4 or higher. The Advanced Microcontroller Bus Architecture (AMBA) supports AXI Coherency Extensions (ACE) protocol and AXI Coherency Extensions Lite (ACE-Lite) protocol, which is a subset of the AXI Coherency Extensions (ACE) protocol. In order to support cache coherence, the AMBA ACE protocol extends the AXI interface. At the ACE interface level, more bus fields to its existing channels to support coherent accesses and three additional sub-channels to support snoop accesses are added. A variant of the AXI Coherency Extensions (ACE) protocol is the AXI Coherency Extensions Lite (ACE-Lite) protocol, which supports IO-coherent accesses only. The AMBA-Lite protocol implements an ACE-Lite interface, which supports IO-coherence. A functional unit with ACE-Lite interface is able to access the content of shared caches but it either does not have its own cache or does not share its contents with other functional units. At the ACE-Lite interface level, the ACE field extensions to AXI are implements but the three extra snoop channels. Examples of functional units with ACE-Lite interface include graphics processing units (GPU) or other hardware accelerators In an example of the present application, the system interconnect 190 and/or processor interconnect 195 of the computing system 100 are implemented in accordance with the Advanced Microcontroller Bus Architecture (AMBA); in particular AMBA version 4 or higher. The processor interconnect 195 may be a cache coherent interconnect (CCI) such as the CCI-400. In an example of the present application, the cache invalidation unit 200 comprises an AXI Coherency Extension Lite (ACE-Lite) interface used to transfer the invalidation requests to the cache memory of the processor unit (CPU) 110. In an example of the present application, the cache invalidation unit 200 has ACE-Lite bus master functionality.

In an example of the present application, an invalidation request comprises a snoop command directed the controller of the cache memory to change the coherent cache status of an addressed cache block to "invalid", i.e. to invalidate an addressed cache line. In an example of the present application, the block address included by an invalidation request comprises at least a tag information. The block address may include a tag information and a set information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

In the claims, any reference signs placed between parentheses shall not be construed as limiting the claim. The word "comprising" does not exclude the presence of other elements or operations then those listed in a claim. Furthermore, the terms "a" or "an", as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A cache invalidation unit, comprising:
    an interface including:
        a trigger input to receive a trigger signal; and
        an invalidation request output to transmit invalidation requests;
    a page address generator unit coupled to the trigger input and arranged to provide a first page address relating to address range in response to receiving the trigger signal; and
    an invalidation request generator unit coupled to the page address generator unit and to the invalidation request output, and arranged to:
        receive the first page address from the page address generator unit; and
        in response to reception of the first page address, provide, at the invalidation request output, a first invalidation request for the first page address,
    wherein the first invalidation request is transmitted to a cache memory of a processor unit of a computing system;
    wherein the page address generator is further configured to provide a second page address;
    wherein the invalidation request generator is further configured to receive the second page address and to provide a second invalidation request; and
    wherein the first and second page addresses are generated by the page address generator unit in accordance with a predefined page size.

2. The cache invalidation unit according to claim 1, wherein the address range comprises a predefined start address and a predefined end address.

3. The cache invalidation unit according to claim 2, wherein a predefined page size corresponds to a page size of the cache memory of the processor unit.

4. The cache invalidation unit according to claim 1, further comprising:
    a configurable memory coupled to the page address generator unit and arranged to store an indication of the address range.

5. The cache invalidation unit according to claim 4, wherein the interface further comprises a configuration input coupled to the configurable memory and arranged to receive additional address ranges to be stored in the configurable memory.

6. The cache invalidation unit according to claim 4, wherein the configurable memory is a writable register and the configuration input is a register interface.

7. The cache invalidation unit according to claim 1, further comprising:
    a configurable table with one or more entries, wherein each entry comprises at least one address range.

8. The cache invalidation unit according to claim 1, wherein the invalidation request output is coupled to an Advanced Microcontroller Bus Architecture (AMBA) Advanced eXtensible Interface (AXI) Coherency Extensions Lite (ACE Lite) interface arranged to transfer invalidation requests.

9. A method of operating a cache invalidation unit for a computing system having a processor unit with a cache memory, said method comprising:
    receiving a trigger signal at a trigger input of a cache invalidation unit;
    retrieving, by the cache invalidation unit, at least one address range;
    generating, by the cache invalidation unit and in response to receiving the trigger signal, one or more page addresses relating to the at least one address range in a page address generator circuit;
    generating, by the cache invalidation unit, an invalidation request for each generated page address at an invalidation request output of the cache invalidation unit; and
    transferring the one or more generated invalidation requests from the cache invalidation unit to the cache memory of the processor unit of the computing system,
    wherein at least two page addresses are generated in accordance with a predefined page size.

10. The method according to claim 9, wherein the at least one address range comprises a predefined start address and a predefined end address.

11. The method according to claim 10, wherein the predefined page size corresponds to a page size of the cache memory of the processor unit of the computing system.

12. The method according to claim 9, further comprising:
    storing an address range in a configurable memory coupled to the page address generator unit.

13. The method according to claim 12, receiving address ranges to be stored in the configurable memory at a configuration input of the configurable memory.

14. The method according to claim 13, wherein the configurable memory is a writable register and the configuration input is a register interface.

15. The method according to claim 9, further comprising:
    a configurable table with one or more entries, wherein each entry comprises at least one address range.

16. The method according to claim 9, wherein the invalidation request output is coupled to an Advanced Microcontroller Bus Architecture (AMBA) Advanced eXtensible Interface (AXI) Coherency Extensions Lite (ACE Lite) interface arranged to transfer the one or more generated invalidation requests.

\* \* \* \* \*